(12) United States Patent
Kaplan et al.

(10) Patent No.: US 7,917,893 B2
(45) Date of Patent: Mar. 29, 2011

(54) USING A SYSTEM OF ANNOTATIONS TO GENERATE VIEWS AND ADAPTERS

(75) Inventors: Jesse D. Kaplan, Redmond, WA (US); John C. Gudenkauf, Bellevue, WA (US); James S. Miller, Bellevue, WA (US); Pete Sheill, Mercer Island, WA (US); Zifeng He, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1056 days.

(21) Appl. No.: 11/715,030

(22) Filed: Mar. 7, 2007

(65) Prior Publication Data

US 2008/0222598 A1    Sep. 11, 2008

(51) Int. Cl.
*G06F 9/44* (2006.01)
(52) U.S. Cl. .................... 717/117; 717/107; 717/110
(58) Field of Classification Search ........... 717/100–123
See application file for complete search history.

(56) References Cited

U.S. PATENT DOCUMENTS

| | | | |
|---|---|---|---|
| 6,106,569 A | 8/2000 | Bohrer et al. | |
| 6,609,158 B1 | 8/2003 | Nevarez et al. | |
| 6,708,074 B1 | 3/2004 | Chi et al. | |
| 2003/0033162 A1 | 2/2003 | Houssiaux et al. | |
| 2003/0110315 A1 | 6/2003 | Upton | |
| 2004/0015858 A1 | 1/2004 | Seto et al. | |
| 2004/0078495 A1 | 4/2004 | Mousseau et al. | |
| 2004/0199372 A1 | 10/2004 | Penn | |
| 2005/0076331 A1 | 4/2005 | Das et al. | |
| 2006/0004845 A1 | 1/2006 | Kristiansen et al. | |
| 2006/0010421 A1 | 1/2006 | Gurevich et al. | |

FOREIGN PATENT DOCUMENTS

WO    WO0206956 A2    1/2002

OTHER PUBLICATIONS

Moise et al., "Integrating a Reverse Engineering Tool with Microsoft Visual Studio .NET", 2004, IEEE, 8 pages.*
Gudenkauf, "PDC05—Managed AddIn Framework (MAF)", Sep. 2005, a Weblog, http://blogs.msdn.com/b/jackg/archive/2005/09/15/468068.aspx, 4 pages.*
Mitchell et al., "Contract-oriented Specifications", 1997, Proceedings TOOLS24, IEEE, 10 pages.*
Rieken, "Design By Contract for Java—Revised", Apr. 2007, Master's Thesis, Oldenburg University, German, pp. i-xvi, 1-125.*

(Continued)

*Primary Examiner* — Ted T Vo

(57) ABSTRACT

Various technologies and techniques are disclosed for using annotations in contracts to generate views and adapters. A framework is provided that supports annotations that can be used in a contract to allow a user to express how one or more members of the contract should be represented in at least one view, and to express how to adapt the members in at least one adapter. Annotations can also be used to indicate which of the components should be programmatically generated. The contract is accessed and at least a portion of the at least one view and the at least one adapter are generated based on the annotations and other information contained in the contract. For example, source code can programmatically be generated for a host side view, an add-in side view, a host side adapter, and an add-in side adapter using the various contract details and the annotations.

20 Claims, 9 Drawing Sheets

OTHER PUBLICATIONS

Bobeff, et al., "Component Specialization", Date: 2004, pp. 39-50, ACM Press, New York, USA, http://delivery.acm.org/10.1145/1020000/1014012/p39-bobeff.pdf?key1=1014012&key2=5756348611&coll=GUIDE&dl=GUIDE&CFID=8721657&CFTOKEN=85233597.

Tatsubori Michiaki, "A Class-Object Model for Program Transformations", Date: Jan. 2002, http://www.csg.is.titech.ac.jp/~mich/English/pub/200201_thesis.pdf.

Veit, et al., "Model-View-Controller and Object Teams: A Perfect Match of Paradigms", Date: 2003, pp. 140-149, ACM Press, New York, USA, http://delivery.acm.org/10.1145/650000/643618/p140-veit.pdf?key1=643618&key2=7926348611&coll=GUIDE&dl=GUIDE&CFID=8721527&CFTOKEN=53718332.

Zoio, Phil, "Building on struts for Java 5 users", Date: Apr. 2006, http://www.theserverside.com/tt/articles/article.tss?l=StrutsforJava5.

* cited by examiner

```
public interface IEventProviderContract : IContract
{
    [SetEvent]
    void OnSomethingHappenening(ISomethingHappenedHandlerContract handler);
}

[Event(typeof(IEventProviderContract),"OnSomethingHappenening")]
public interface ISomethingHappenedHandlerContract : IContract
{
    void Handler(ISomethingHappeneningEventArgsContract args);
}

[EventArgs(Cancelable=true)]
public interface ISomethingHappeneningEventArgsContract : IContract
{
    [Property(PropertyType.get,"Triple")]
    ITripleContract GetTriple();
}
```

```
public abstract class EventProvider { public System.EventHandler<SomethingHappeningEventArgs>
OnSomethingHappenening;
} public abstract class SomethingHappeningEventArgs :
System.ComponentModel.CancelEventArgs { public abstract Triple Triple {
        get;
    }
}
```

```
public interface IPairContract : IContract
{
    [Property(PropertyType.get, "A")]
    int GetA();
    [Property(PropertyType.get, "B")]
    int GetB();
    [Property(PropertyType.set, "A")]
    void SetA(int a);
    [Property(PropertyType.set, "B")]
    void SetB(int b);
}
```

FIG. 7

USING A SYSTEM OF ANNOTATIONS TO GENERATE VIEWS AND ADAPTERS

BACKGROUND

In the modern software development industry, applications are conceived and developed with a certain set of features. These applications are, in some instances, developed such that additional functionality may be added after the original development has been completed. In these circumstances, the additional functionality is created in autonomous units called add-ins. Special code must be created that facilitates the communication between the original application, sometimes referred to as the host, and the add-in. Further, an add-in could potentially be used by several hosts while a single host might use several add-ins.

There are typically five logical units of code that need to be created in order to enable add-in functionality. The first is the contract which defines, but does not implement, all of the functionality available to the add-in that is available from the host application and vice versa. These contracts are typically defined as a set of interfaces but could also be defined as abstract base classes, XML, etc. What matters is that they define a protocol for communication between the host and the add-in. The next components that need to be created are the host and add-in views. These views are typically implemented as a set of abstract base classes or interfaces that both the host and the add-in will program against. In other words, both of these views define "what" is to be implemented by each party, but lack specific implementations. Finally, adapters are created for both the add-in and the host. Adapters contain specific implementations that serve as translators to convert to and from the view and the contract.

In developing add-ins, the developer must write and maintain the source code for each of these components. This process can become very tedious because there are multiple places to update some of the same details. For example, a change to the contract can affect all four of the other components.

SUMMARY

Various technologies and techniques are disclosed for using annotations in contracts to generate views and adapters. A framework is provided that supports annotations that can be used in a contract to allow a user to express how one or more members of the contract should be represented in at least one view, and to express how to adapt the members in at least one adapter. Annotations can also be used to indicate which of the components should be programmatically generated. In one implementation, the annotations are made in the contract using a declarative syntax.

A code generator accesses the contract and programmatically generates source code for the at least one view and the at least one adapter based on the annotations and other information contained in the contract. In one implementation, source code is programmatically generated for a host side view, an add-in side view, a host side adapter, and an add-in side adapter using the various contract details and the annotations. In another implementation, the views and/or adapters are generated programmatically at runtime from the information contained in the contract. In other implementations, some, all, or additional components are generated programmatically.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a process flow diagram for one implementation of the system of FIG. 1 illustrating the stages involved in using annotations in a contract to impact programmatically generated views and adapters for an add-in.

FIG. 4 is a process flow diagram for one implementation of the system of FIG. 1 illustrating the stages involved in using annotations to indicate which components should be generated for an add-in.

FIG. 5 is an exemplary contract that includes annotations to express how an add-in view should be generated with an event.

FIG. 6 is an exemplary view that is programmatically generated with an event from the contract shown in FIG. 5.

FIG. 7 is an exemplary contract that includes annotations to express how an add-in view should be generated with properties.

DETAILED DESCRIPTION

Figure 1:
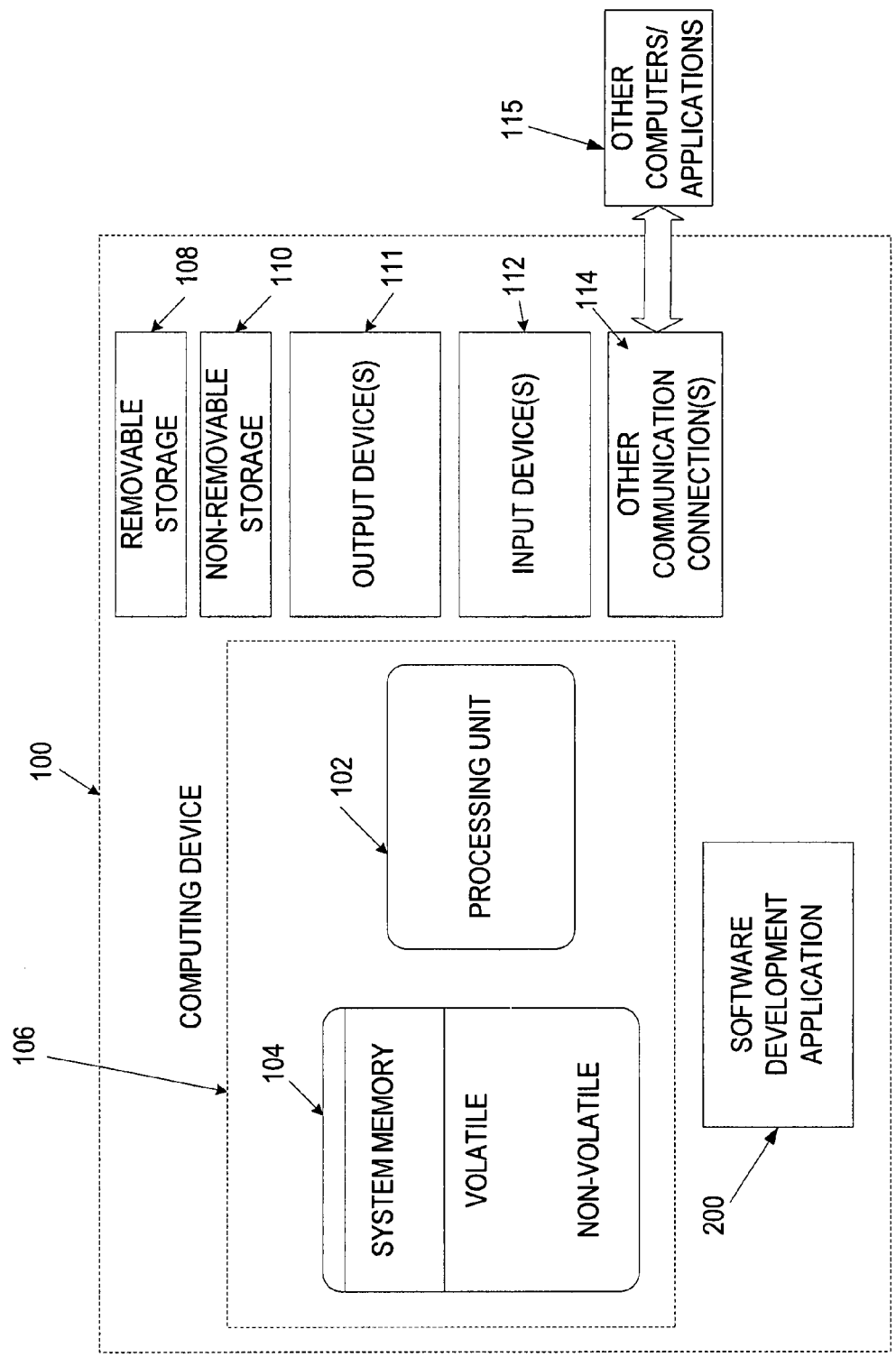
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows for development of add-in components, but the system also serves other purposes in addition to these. In one implementation, one or more of the techniques described herein can be implemented as features within an integrated development environment such as MICROSOFT® VISUAL STUDIO®, or from any other type of program or service that allows a user to develop add-in components. In another implementation, one or more of the techniques described herein are implemented as features with other applications that deal with programmatic generation of source code and/or runtime interpretation of the contract annotations.

In one implementation, a system is provided that allows annotations to be included in add-in contracts that specify how views and adapters should be programmatically generated for the add-ins. These annotations can include members that need to be included in views and/or adapters but that do not otherwise serve any purpose within the contract. In other words, the contract becomes a sort of "documentation center" that not only specifies the agreement between the host and the add-in, but that also specifies how the system should programmatically generate the views and the adapters in a way that will allow them to save the software developer time. This allows the developer to focus his efforts on generating the contract, and leave the tedious code generation of the add-in components to the system. In one implementation, the system generates the source code at design time, and then allows the developer to further revise the source code as desired. In another implementation, the system generates the source code and/or executable code at runtime and then runs the components (after compilation if required). When talking about source code generation in the various examples discussed herein, both of these design time and runtime scenarios can be applicable, unless otherwise noted.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software development application 200. Software development application 200 will be described in further detail in FIG. 2.

Figure 2:
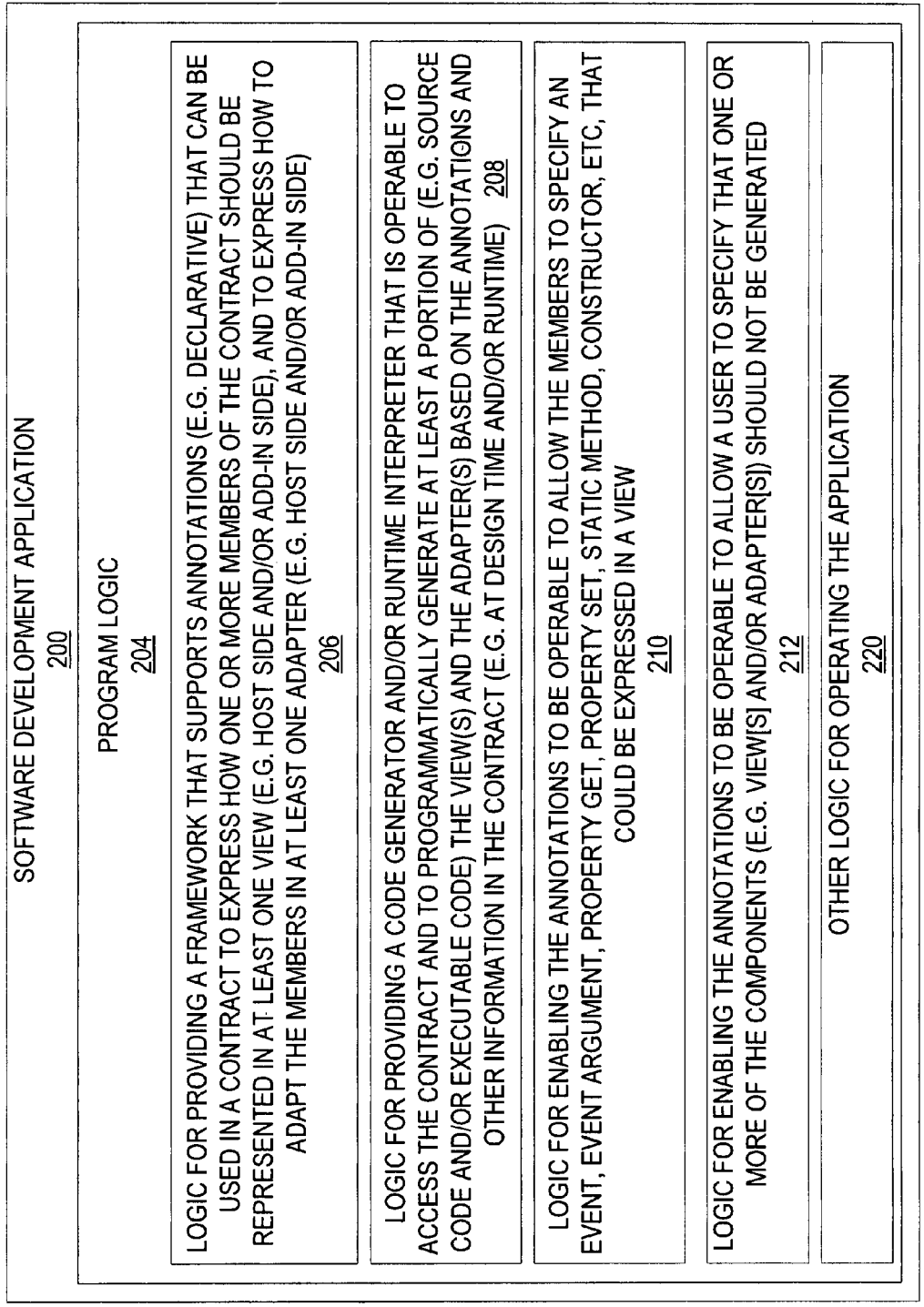
FIG. 2 is a diagrammatic view of a software development application of one implementation operating on the computer system of FIG. 1.

Turning now to FIG. 2 with continued reference to FIG. 1, a software development application 200 operating on computing device 100 is illustrated. Software development application 200 is one of the application programs that reside on computing device 100. However, it will be understood that software development application 200 can alternatively or additionally be embodied as computer-executable instructions on one or more computers and/or in different variations than shown on FIG. 1. Alternatively or additionally, one or more parts of software development application 200 can be part of system memory 104, on other computers and/or applications 115, or other such variations as would occur to one in the computer software art.

Software development application 200 includes program logic 204, which is responsible for carrying out some or all of the techniques described herein. Program logic 204 includes logic for providing a framework that supports annotations (e.g. declarative) that can be used in a contract to express how one or more members of the contract should be represented in at least one view (e.g. host side and/or add-in side), and to express how to adapt the members in at least one adapter (e.g. host side and/or add-in side) 206; logic for providing a code generator and/or runtime interpreter that is operable to access the contract and to programmatically generate at least a portion of (e.g. the source code and/or executable code) the view(s) and the adapter(s) based on the annotations and other information in the contract (e.g. at design time and/or at runtime) 208; logic for enabling the annotations to be operable to allow the members to specify an event, event argument, property get, property set, static method, constructor, etc, that could be expressed in a view 210; logic for enabling the annotations to be operable to allow a user to specify that one or more of the components (e.g. view[s] and/or adapter [s]) should not be generated 212; and other logic for operating the application 220. In one implementation, program logic 204 is operable to be called programmatically from another program, such as using a single call to a procedure in program logic 204.

Figure 3:
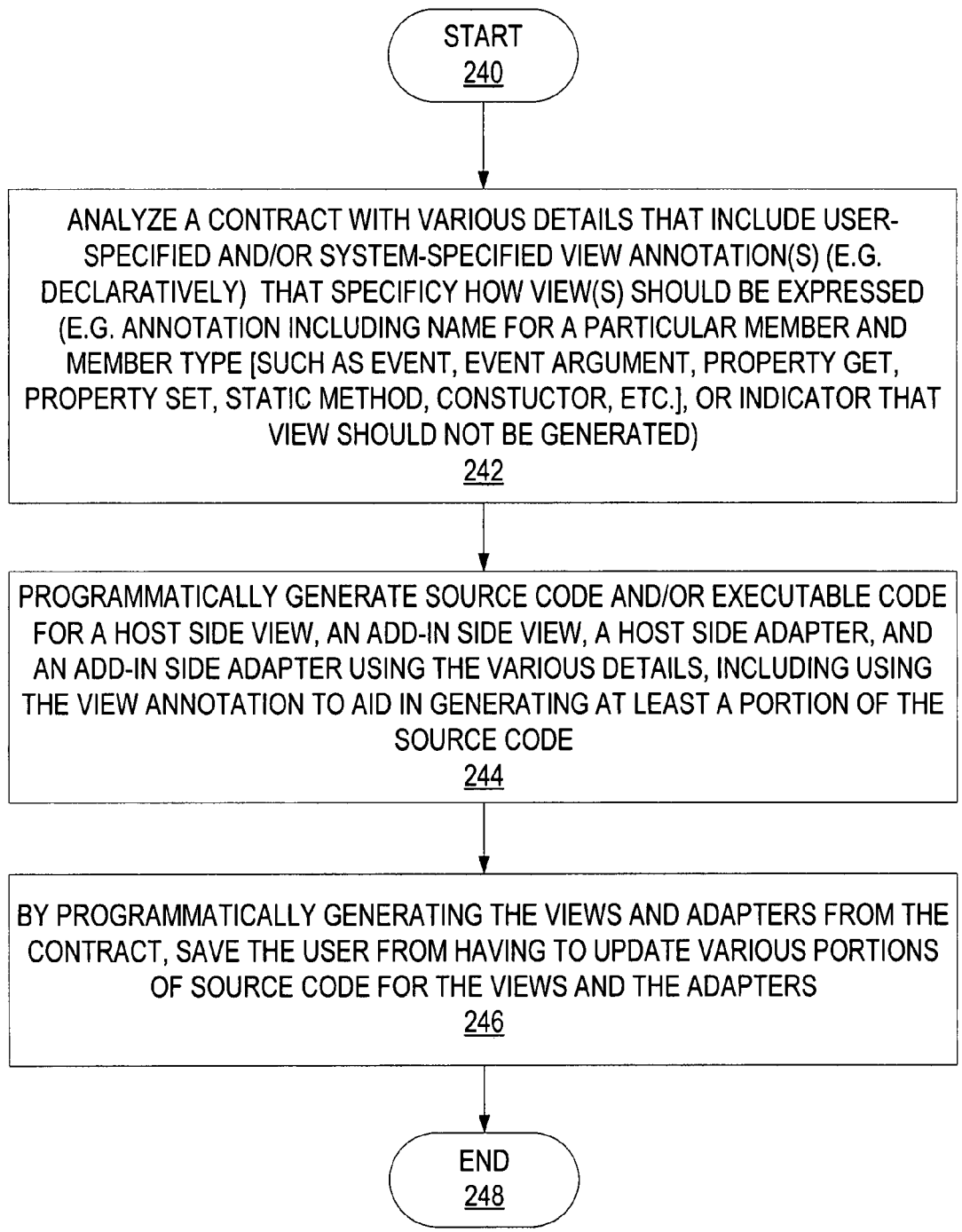
Figure 4:
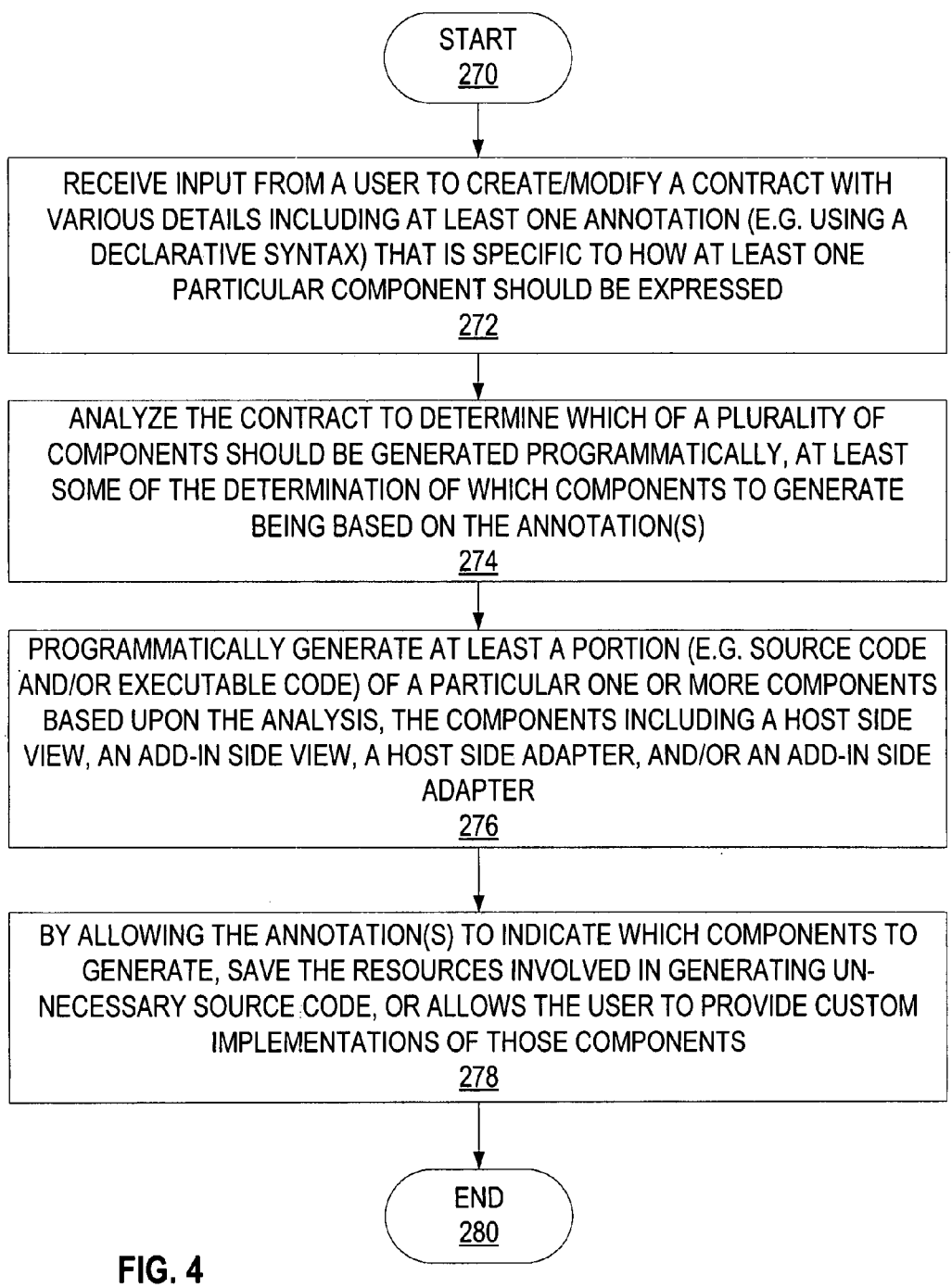
Figure 8:
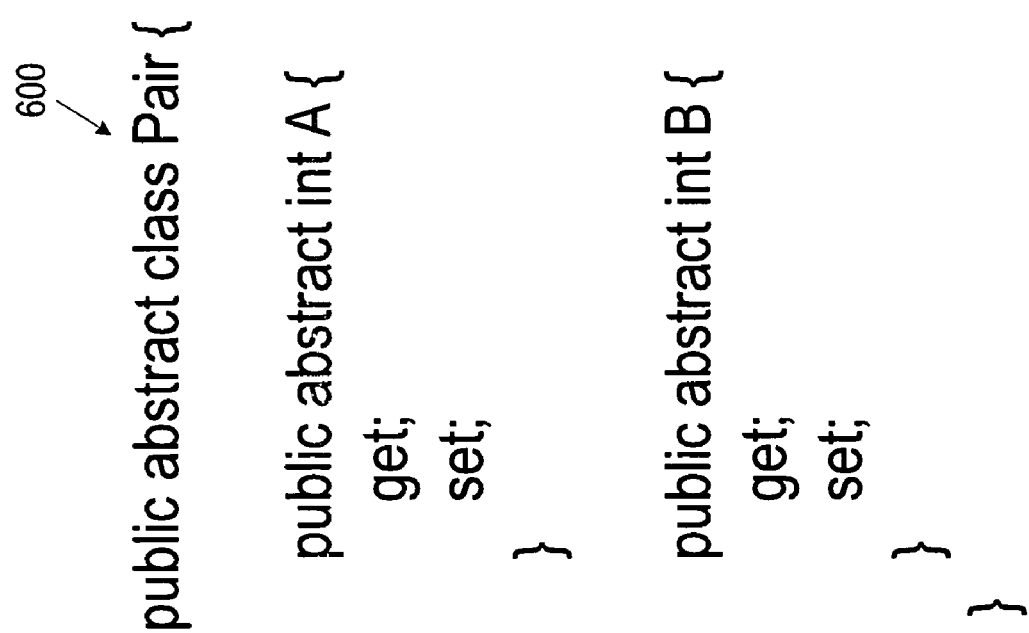
FIG. 8 is an exemplary view that is programmatically generated with the properties from the contract shown in FIG. 7.

Turning now to FIGS. 3-4 with continued reference to FIGS. 1-2, the stages for implementing one or more implementations of software development application 200 are described in further detail. FIG. 3 is a high level process flow diagram illustrating the stages involved in using annotations in a contract to impact programmatically generated views and adapters for an add-in. In one form, the process of FIG. 3 is at least partially implemented in the operating logic of computing device 100. The process begins at start point 240 with analyzing a contract with various details that include user-specified and/or system-specified view annotation(s) (e.g. declaratively) that specify how views(s) should be expressed (stage 242). In one implementation, a declarative syntax, such as a custom attribute is used. Alternatively or additionally, source comments, separate files, naming conventions in the contract, etc. could be used to implement the annotations.

In one implementation, the annotation includes a name for a particular member, along with a member type (stage 242). A few non-limiting examples of member types include event, event argument, property get, property set, static method, constructor, etc. Alternatively or additionally, the annotation can include one or more attributes that indicate that one or more components should not be generated (stage 242). The system makes use of the annotation at runtime and/or programmatically generates source code and/or executable code for a host side view, an add-in side view, a host side adapter, and an add-in side adapter using the various details, including using the view annotation to aid in generating at least a portion of the source code (stage 244). By programmatically generating the views and adapters from the contract, the user is saved from having to update various portions of source code for the views and the adapters (stage 246). The process ends at end point 248.

FIG. 4 illustrates one implementation of the stages involved in using annotations to indicate which components should be generated for an add-in. In one form, the process of FIG. 4 is at least partially implemented in the operating logic of computing device 100. The procedure begins at start point 270 with receiving input from a user to create/modify a contract with various details including at least one annotation that is specific to how at least one particular component should be expressed (stage 272). In one implementation, a declarative syntax is used. The system analyzes the contract to determine which of a plurality of components should be generated programmatically, at least some of the determination of which components to generate being based on the annotation(s) (stage 274). The system programmatically generates at least a portion of (e.g. the source code and/or executable code) a particular one or more components based upon the analysis (stage 276). The components for which code is generated includes a host side view, an add-in side view, a host side adapter, and/or and add-in side adapter (stage 276). By allowing the annotation(s) to indicate which components to generate, the system saves the resources involved in generating un-necessary source code, or allows the user to provide custom implementations of those components (stage 278). The process ends at end point 280.

FIGS. 5-8 illustrate some examples of how the system can be used in one implementation to generate views and adapters using annotations in a contract for an add-in. The example code and specific syntax shown in FIGS. 5-8 are just examples, and various other ways for annotating contracts to generate views and adapters could also be used. FIG. 5 is an exemplary contract 300 that includes annotations to express how an add-in view should be generated that includes an event. In one implementation, events and delegates are explicitly not permissible in contracts since they cannot be properly remoted across isolation boundaries. However, the system has a framework that allows events to be specified in the contract using annotations, like the ones shown in the exemplary contract 300.

The contract 300 consists of three parts: the definition of the class that has the event and the definition of the member that represents it (OnSomethingHappening). There is another interface (ISomethingHappenedHandlerContract) that acts like a delegate and is passed across the boundary. There is also the ISomethingHappeningEventArgs that represents the EventArgs that get passed with the event. The user generates such a contract, and can use the system to programmatically generate the class for the user. In one implementation, this programmatically generated class is the same class that the user would expect if they were programming directly against the host with no isolation boundary. As example of such a programmatically generated view is shown in the code example 400 of FIG. 6. The code example of the view 400 has an event sitting off the main class that is defined as having SomethingHappeningEventArgs. Then, there is a class that represents those event args with the properties defined in the contract. Behind the scenes, there are three more classes generated in the adapters that do the work to convert from the contract to the abstract base class and three more that go from the abstract base class to the contract.

Turning now to FIG. 7, an exemplary contract 500 is shown that includes annotations to express how an add-in view should be generated with properties. Two methods are defined that have the same function but that cannot technically be properties because properties are not allowed on at least one implementation of contracts. Using the annotations, however, for each item that should be expressed to developers as a property, the user applies a tag to it, specifies whether it is a get property or a set property, and specifies the name to use for the property. The system then programmatically generates a view similar to the one shown in the code example 600 of FIG. 8. The view contains the property get and set statements for each of the methods. In one implementation, there is also adapter code behind the scenes that does the work to convert it to and from the methods and properties and does the name conversion.

Figure 9:
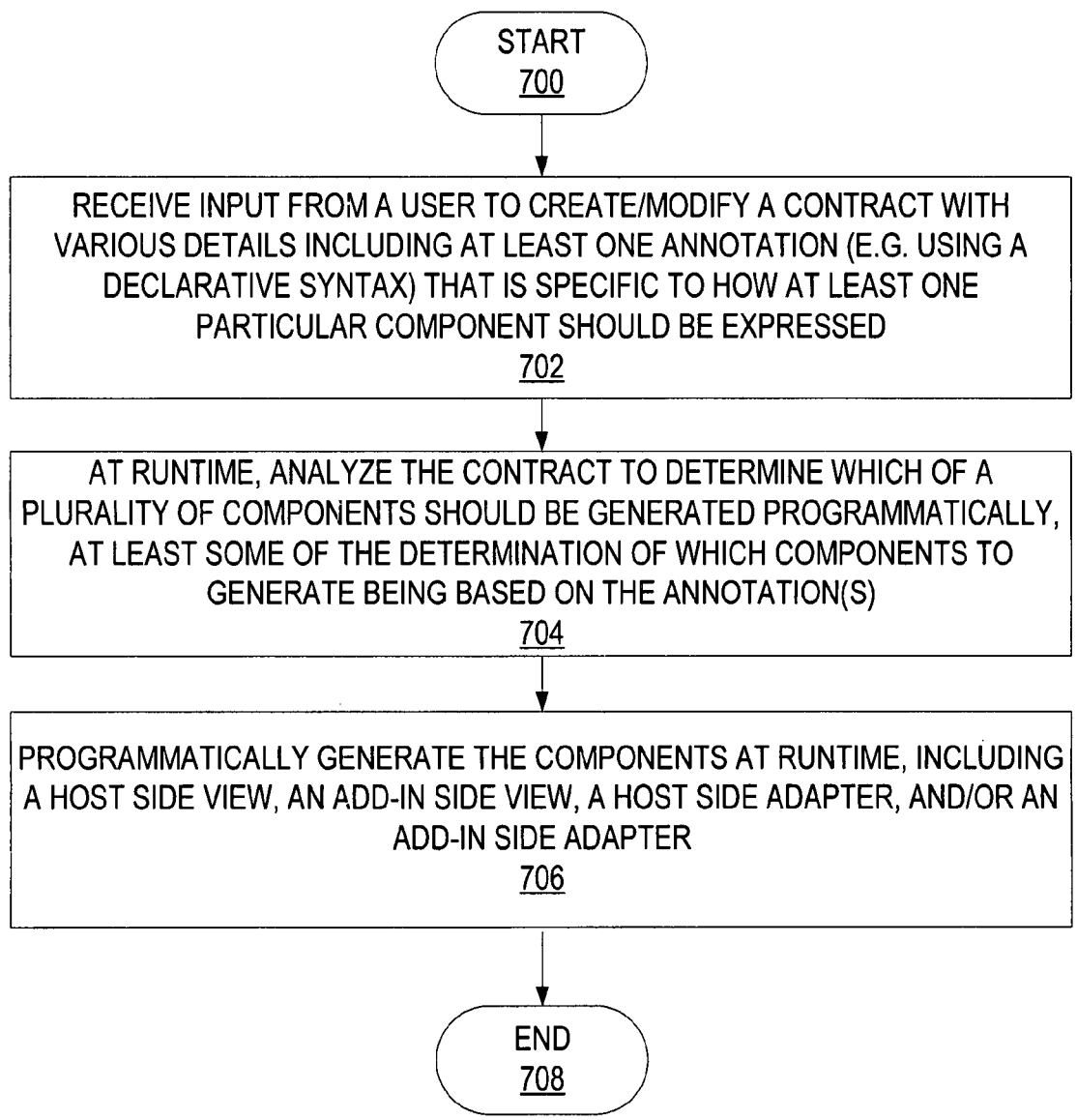
FIG. 9 is a process flow diagram for one implementation of the system of FIG. 1 illustrating the stages involved in programmatically generating adapters and views at runtime based upon annotations in the contract.

FIG. 9 illustrates one implementation of the stages involved in programmatically generating adapters and views at runtime based upon annotations in the contract. In one form, the process of FIG. 9 is at least partially implemented in the operating logic of computing device 100. The process begins at start point 700 with receiving input from a user to create/modify a contract with various details including at least one annotation (e.g. using a declarative syntax) that is specific to how at least one particular component should be expressed (stage 702). At runtime, the system analyzes the contract to determine which of a plurality of components should be generated programmatically, at least some of the determination of which components to generate being based on the annotation(s) (stage 704). The system then programmatically generates the components at runtime, including a host side view, an add-in side view, a host side adapter, and/or an add-in side adapter (stage 706). The process ends at end point 708.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:
provide a framework that supports annotations that can be used in a contract to express how one or more members of the contract should be represented in at least one view, and to express how to adapt the one or more members in at least one adapter, the contract defines functionality available to the add-in from the host application, and, functionality available to the host application from the add-in; and
access the contract and programmatically generate at least a portion of the at least one view and the at least one adapter based on the annotations and other information contained in the contract.

2. The computer-readable storage medium of claim 1, wherein the at least one view includes one or more views selected from the group consisting of a host side view and an add-in side view.

3. The computer-readable storage medium of claim 1, wherein the at least one adapter includes one or more adapters selected from the group consisting of a host-side adapter and an add-in side adapter.

4. The computer-readable storage medium of claim 1, wherein the framework is operable to support annotations using a declarative syntax.

5. The computer-readable storage medium of claim 1, wherein the annotations are operable to allow at least one of the one or more members to specify an event that should be expressed in the view.

6. The computer-readable storage medium of claim 1, wherein the annotations are operable to allow at least one of the one or more members to specify a property that should be expressed in the view.

7. The computer-readable storage medium of claim 1, wherein the annotations are operable to allow a user to specify one or more particular components that should not be generated.

8. The computer-readable storage medium of claim 7, wherein the one or more particular components are selected from the group consisting of the view and the adapter.

9. A method for annotating a contract to programmatically generate views and adapters comprising the steps of:
   analyzing a contract, the contract having various details, the various details in the contract including at least one view annotation that is specific to how at least one view should be expressed; and
   programmatically generating source code for a host side view, an add-in side view, a host side adapter, and an add-in side adapter using the various details, including using the view annotation to aid in generating at least a portion of the source code.

10. The method of claim 9, wherein a type of the at least one view annotation is selected from the group consisting of an event, an event argument, a property get, a property set, a static method, and a constructor.

11. The method of claim 9, wherein the at least one view annotation is expressed using a declarative syntax.

12. The method of claim 9, wherein the at least one view annotation includes a name for a member to be included in the view.

13. The method of claim 12, wherein the at least one view annotation further includes a type of member that the member should represent.

14. The method of claim 9, wherein the at least one view annotation indicates that the at least one view should not be programmatically generated.

15. The method of claim 9, wherein the at least one view annotation specifies that a particular view member should be expressed as a property.

16. The method of claim 9, wherein the at least one view annotation specifies that a particular view member should be expressed as an event.

17. A computer-readable storage medium having computer-executable instructions for causing a computer to perform the steps recited in claim 9.

18. A method for annotating a contract to indicate which components to generate comprising the steps of:
   receiving input from a user to create a contract, the contract having various details, the various details in the contract including at least one annotation that is specific to how at least one particular component should be expressed;
   analyzing the contract to determine which of a plurality of components should be generated programmatically, at least some of the determination of which components to generate programmatically being based on the at least one annotation; and
   programmatically generating at least a portion of one or more components based upon the analysis, the components being selected from the group consisting of a host side view, an add-in side view, a host side adapter, and an add-in side adapter.

19. The method of claim 18, wherein the at least one annotation is specified using a declarative syntax.

20. A computer-readable storage medium having computer-executable instructions for causing a computer to perform the steps recited in claim 18.

\* \* \* \* \*